(12) United States Patent
Tsuzuki et al.

(10) Patent No.: US 6,480,968 B1
(45) Date of Patent: Nov. 12, 2002

(54) METHOD AND APPARATUS FOR TRANSMITTING PACKET OF DATA

(75) Inventors: Kengo Tsuzuki, Machida; Toshiaki Shinohara, Omiya, both of (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/427,095

(22) Filed: Oct. 26, 1999

(30) Foreign Application Priority Data

Dec. 16, 1998 (JP) .......................................... 10-358094

(51) Int. Cl.⁷ ................................................. G06F 1/04
(52) U.S. Cl. ........................................ 713/600; 713/502
(58) Field of Search ................................. 713/500, 502, 713/600

(56) References Cited

U.S. PATENT DOCUMENTS 5,710,773 A * 1/1998 Shiga .......................... 370/512
6,006,286 A * 12/1999 Baker et al. ................... 710/22
6,148,051 A * 11/2000 Fujimori et al. ............. 375/356
6,172,989 B1 * 1/2001 Yanagihara et al. ......... 370/473

FOREIGN PATENT DOCUMENTS

| EP | 0828394 | 3/1998 |
| EP | 0873019 | 10/1998 |
| JP | 9-130655 | 5/1997 |
| WO | WO 9523495 | 9/1995 |

* cited by examiner

Primary Examiner—Dennis M. Butler
(74) Attorney, Agent, or Firm—Louis Woo

(57) ABSTRACT

An information source sequentially outputs data, and outputs a timing signal related to the data. A packet generator produces a packet from the data outputted by the information source. A FIFO memory temporarily stores the packet produced by the packet generator, and outputs the packet. A first device operates for detecting a specified relative timing within a duration of the packet which is being inputted into the FIFO memory in response to the timing signal outputted by the information source. A second device operates for receiving the packet outputted by the FIFO memory, and transmitting the packet during a first nominal cycle after the first device detects the specified relative timing.

6 Claims, 5 Drawing Sheets

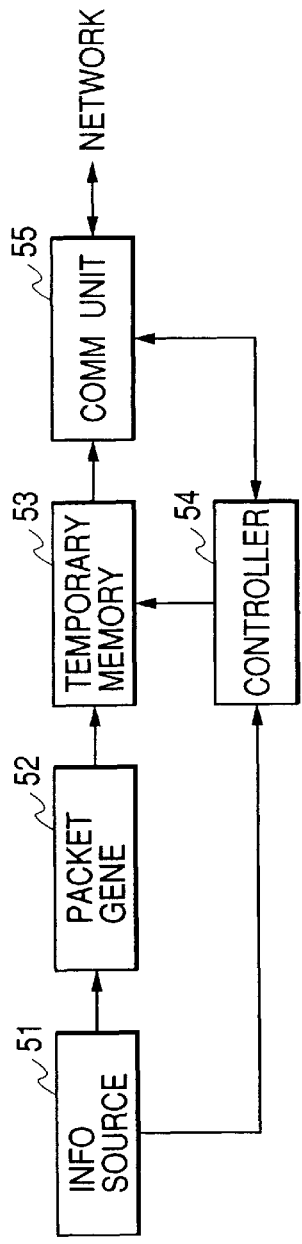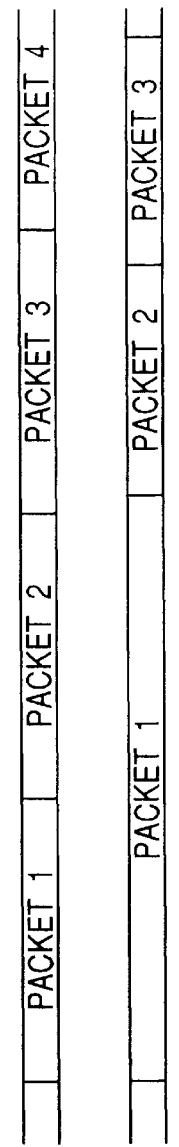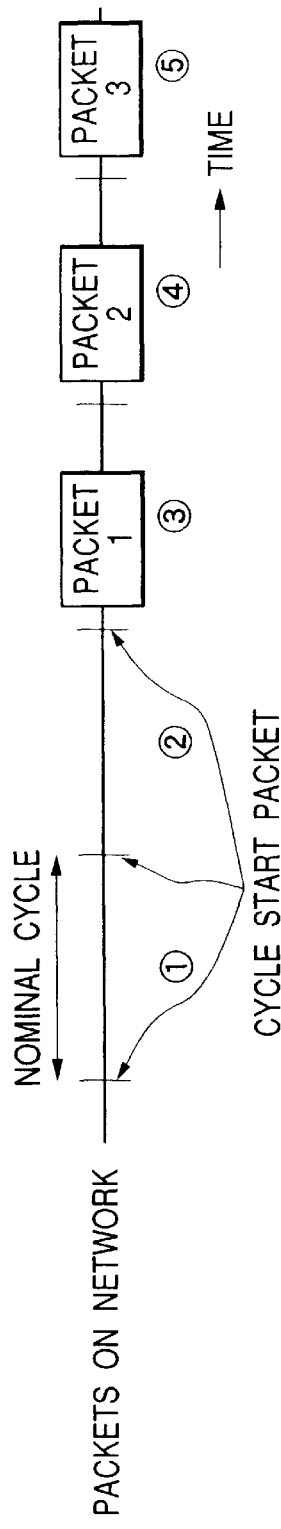

METHOD AND APPARATUS FOR TRANSMITTING PACKET OF DATA

BACKGROUND OF THE INVENTION

1. Field of the Invention

This invention relates to a method and an apparatus for transmitting a packet of data to a digital network.

2. Description of the Related Art

It is known to transmit packets of data through a digital network such as an IEEE1394 serial bus. When a slave station intends to transmit packets of data to the network, the slave station informs a master station of its intention. Normally, the master station periodically transmits a cycle start packet to the network in response to the information fed from the slave station. The period of repetitive transmission of the cycle start packet is equal to a time interval of 125 $\mu$s which is referred to as a nominal cycle. The slave station captures every cycle start packet. The slave station sequentially transmits isochronous packets of data to the network in response to the captured cycle start packets. In the case where the slave station has a temporary memory in a data flow path, a long delay time tends to occur before the transmission of isochronous packets of data is started.

Japanese published unexamined patent application 9-130655 discloses an image pickup apparatus including an imaging device for converting a picked-up image to an analog signal. In the apparatus of Japanese application 9-130655, an A/D converter changes the analog signal to a digital signal. In addition, a signal processing means converts the digital signal to a video signal. A transmission/reception circuit transmits the video signal in a serial format. Then, a system timing generating means operates the imaging device synchronously with a timing signal for driving the transmission/reception circuit. Accordingly, the data transmission rate of the output signal of the imaging device and the data transmission rate of the output signal of the transmission/reception circuit are matched to each other.

In the apparatus of Japanese application 9-130655, the video signal transmitted from the transmission/reception circuit has a sequence of 1-line-corresponding segments each having a start sync signal, an effective 1-line video data piece, and an end sync signal temporally arranged in that order.

In the case where the apparatus of Japanese application 9-130655 is connected with a communication system prescribing a data transmission rate which differs from the original data transmission rate determined by the transmission/reception circuit, it is necessary to provide a data-rate matching circuit.

SUMMARY OF THE INVENTION

It is a first object of this invention to provide an improved method of transmitting a packet of data to a digital network.

It is a second object of this invention to provide an improved apparatus for transmitting a packet of data to a digital network.

A first aspect of this invention provides a method comprising the steps of a) sequentially outputting data, and outputting a timing signal related to the data; b) producing a packet from the data outputted by the step a); c) temporarily storing the packet produced by the step b), and outputting the packet; d) detecting a specified relative timing within a duration of the packet which is being stored by the step c) in response to the timing signal outputted by the step a); and e) receiving the packet outputted by the step c), and transmitting the packet during a first nominal cycle after the step d) detects the specified relative timing.

A second aspect of this invention provides a method comprising the steps of a) sequentially outputting data, and outputting a timing signal related to the data; b) sequentially producing packets from the data outputted by the step a); c) temporarily storing the packets produced by the step b), and sequentially outputting the packets; d) detecting a specified relative timing within a duration of each packet which is being stored by the step c) in response to the timing signal outputted by the step a); e) incrementing a first packet number when the step d) detects the specified relative timing; f) deciding whether the first packet number incremented by the step e) is equal to or different from a second packet number at a start of every nominal cycle; g) receiving a packet outputted by the step c), and transmitting the received packet during a nominal cycle having a start at which the step f) decides that the first packet number is different from the second packet number; and h) incrementing the second packet number when the transmission of the packet by the step g) is completed.

A third aspect of this invention is based on the second aspect thereof, and provides a method wherein the step d) comprises counting pulses of a pixel-corresponding clock signal in the timing signal outputted by the step a), and generating a signal representing a horizontal address in accordance with the number of the counted pulses; comparing the horizontal-address signal with a first reference signal representing a predetermined horizontal address, and outputting a first identity-indicating signal when the horizontal-address signal is equal to the first reference signal; counting pulses of a horizontal sync signal in the timing signal outputted by the step a), and generating a signal representing a vertical address in accordance with the number of the counted pulses; comparing the vertical-address signal with a second reference signal representing at least one predetermined vertical address, and outputting a second identity-indicating signal when the vertical-address signal is equal to the second reference signal; and detecting a timing at which both the first identity-indicating signal and the second identity-indicating signal are outputted as the specified relative timing.

A fourth aspect of this invention provides a packet transmission apparatus comprising an information source sequentially outputting data, and outputting a timing signal related to the data; a packet generator producing a packet from the data outputted by the information source; a FIFO memory temporarily storing the packet produced by the packet generator, and outputting the packet; first means for detecting a specified relative timing within a duration of the packet which is being inputted into the FIFO memory in response to the timing signal outputted by the information source; and second means for receiving the packet outputted by the FIFO memory, and transmitting the packet during a first nominal cycle after the first means detects the specified relative timing.

A fifth aspect of this invention provides a packet transmission apparatus comprising an information source sequentially outputting data, and outputting a timing signal related to the data; a packet generator sequentially producing packets from the data outputted by the information source; a FIFO memory temporarily storing the packets produced by the packet generator, and sequentially outputting the packets; first means for detecting a specified relative timing within a duration of each packet which is being inputted into the FIFO memory in response to the timing signal outputted by the information source; second means for incrementing a first packet number when the first means detects the specified relative timing; third means for deciding whether the first packet number incremented by the second means is equal to or different from a second packet number at a start of every nominal cycle; fourth means for receiving a packet outputted by the FIFO memory, and transmitting the received packet during a nominal cycle having a start at which the third means decides that the first packet number is different from the second packet number; and fifth means for incrementing the second packet number when the transmission of the packet by the fourth means is completed.

A sixth aspect of this invention is based on the fifth aspect thereof, and provides a packet transmission apparatus wherein the first means comprises a horizontal address generator for counting pulses of a pixel-corresponding clock signal in the timing signal outputted by the information source, and generating a signal representing a horizontal address in accordance with the number of the counted pulses; a first comparator for comparing the horizontal-address signal generated by the horizontal address generator with a first reference signal representing a predetermined horizontal address, and for outputting a first identity-indicating signal when the horizontal-address signal is equal to the first reference signal; a vertical address generator for counting pulses of a horizontal sync signal in the timing signal outputted by the information source, and generating a signal representing a vertical address in accordance with the number of the counted pulses; a second comparator for comparing the vertical-address signal generated by the vertical address generator with a second reference signal representing at least one predetermined vertical address, and for outputting a second identity-indicating signal when the vertical-address signal is equal to the second reference signal; and means for detecting a timing at which the first comparator and the second comparator output the first identity-indicating signal and the second identity-indicating signal as the specified relative timing.

BRIEF DESCRIPTION OF THE DRAWINGS

FIG. 1 is a block diagram of a prior-art slave station.

FIG. 2 is a time-domain diagram of various data which occur in the prior-art slave station of FIG. 1.

DESCRIPTION OF THE PREFERRED EMBODIMENTS

Figure 3:
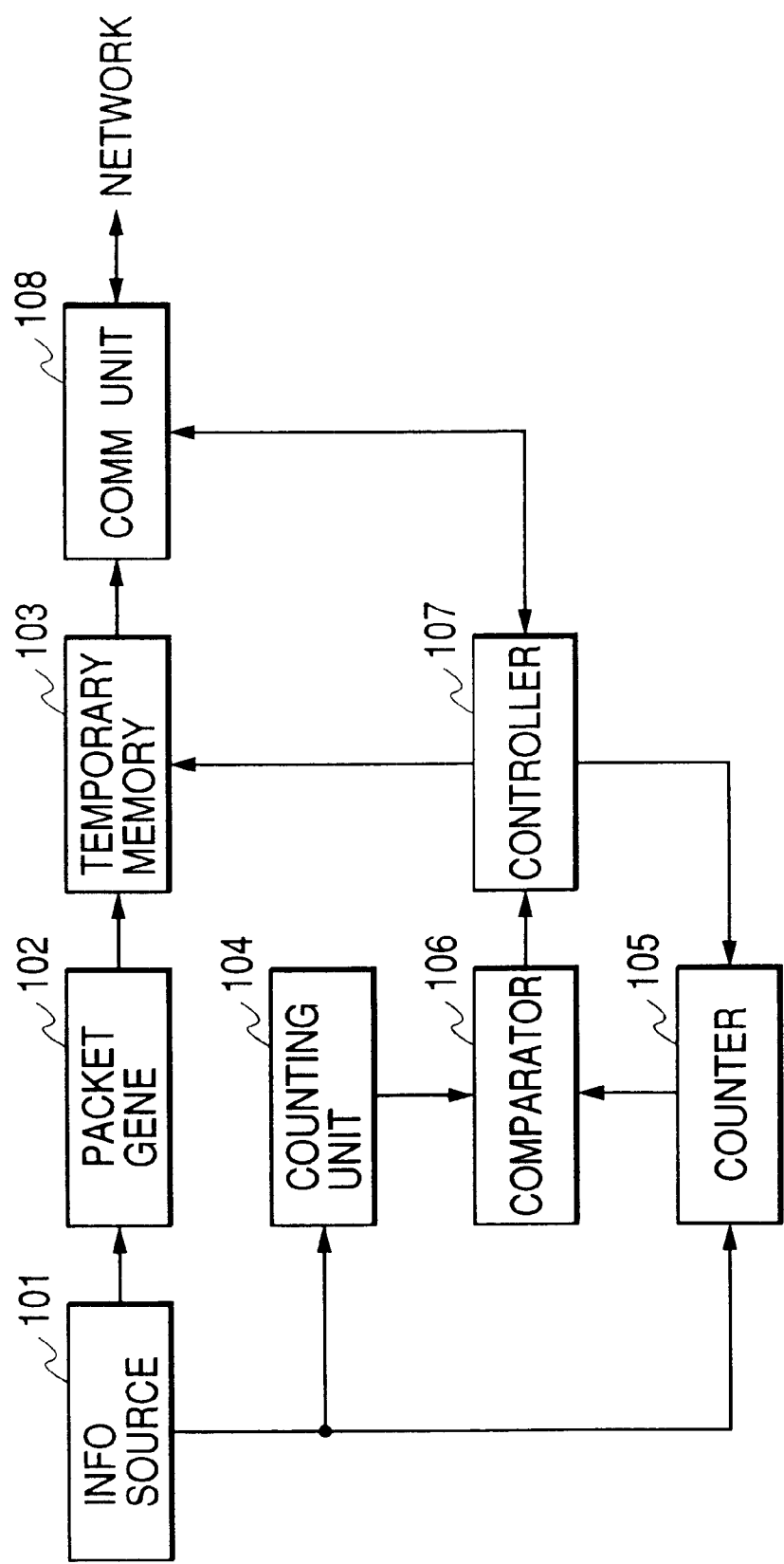
FIG. 3 is a block diagram of a packet transmission apparatus according to a first embodiment of this invention.

A prior-art slave station connected to a digital network will be explained for a better understanding of this invention. The prior-art slave station has the function to sequentially transmit packets of data to the network.

FIG. 1 shows the prior-art slave station which includes an information source 51, a packet generator 52, a temporary memory or a buffer memory 53, a communication unit 55, and a controller 54. The information source 51 generates first data to be transmitted. The information source 51 includes, for example, an imaging device. The information source 51 outputs the first data to the packet generator 52. The packet generator 52 encodes the first data into second data of a predetermined packet format. Specifically, the packet generator 52 divides the first data into pieces, and adds headers to the data pieces to form packets respectively. Each packet has a header and a data piece. The packet generator 52 sequentially writes the packets of data into the temporary memory 53. The memory 53 temporarily stores every packet of data. The temporary memory 53 sequentially outputs the packets of data to the communication unit 55. The temporary memory 53 includes a FIFO memory. The communication unit 55 includes a buffer memory for temporarily storing the data outputted from the memory 53.

A master station (not shown) repetitively transmits a cycle start packet to the network at a predetermined period referred to as a nominal cycle. Every cycle start packet indicates the start of the related nominal cycle.

In the prior-art slave station of FIG. 1, the communication unit 55 receives every cycle start packet from the network. The communication unit 55 informs the controller 54 of the reception of every cycle start packet. Thus, the communication unit 55 informs the controller 54 of the start of every nominal cycle. The controller 54 includes, for example, a microcomputer or a signal processor which operates in accordance with a program stored therein. The program is designed to implement the following processes. The device 54 controls the data readout from the temporary memory 53. To this end, the device 54 outputs a control signal to the temporary memory 53. The controller 54 receives a signal from the information source 51 which relates to the amount of the first data outputted therefrom. At the start of every nominal cycle, the controller 54 decides whether or not one complete packet of data is in a set of the temporary memory 53 and the buffer memory in the communication unit 55 on the basis of the data-amount-related signal from the information source 51 and the control signal to the temporary memory 53. In the case where it is decided that one complete packet of data is in the set of the temporary memory 53 and the buffer memory in the communication unit 55, the device 54 controls the communication unit 55 so that the packet of data will be transmitted therefrom to the network as an isochronous packet of data during the present nominal cycle. In addition, the device 54 controls the temporary memory 53, thereby transferring the remaining data in the packet to the communication unit 55 therefrom and enabling the communication unit 55 to implement the transmission of the whole of the packet of data to the network. On the other hand, in the case where it is decided that one complete packet of data is not in the set of the temporary memory 53 and the buffer memory in the communication unit 55, the device 54 controls the communication unit 55 to inhibit the transmission of a packet of data therefrom to the network.

The prior-art slave station of FIG. 1 operates as follows. With reference to FIG. 2, data composing a first packet 1 are sequentially written into the temporary memory 53 during a first nominal cycle ① and a former portion of a second nominal cycle ②. Then, data composing a second packet 2 are sequentially written into the temporary memory 53 during a latter portion of the second nominal cycle ② and a former portion of a third nominal cycle ③. The data composing the first packet 1 are sequentially read out from the temporary memory 53 during a time interval from the moment of the start of the first nominal cycle ① to a moment within the third nominal cycle ③. The data composing the second packet 1 are sequentially read out from the temporary memory 53 during a subsequent time interval which terminates at a moment within a fourth nominal cycle ④. At the moment of the start of the first nominal cycle ①, the whole of the first packet 1 of data has not yet been in the set of the temporary memory 53 and the buffer memory in the communication unit 55. As a result, the first packet 1 of data is not transmitted to the network during the first nominal cycle ①. At the moment of the start of the second nominal cycle ②, the whole of the first packet 1 of data has not yet been in the set of the temporary memory 53 and the buffer memory in the communication unit 55. As a result, the first packet of data is not transmitted to the network during the second nominal cycle ②. At the moment of the start of the third nominal cycle ③, the whole of the first packet 1 of data has been in the set of the temporary memory 53 and the buffer memory in the communication unit 55. As a result, the first packet 1 of data is transmitted to the network during the third nominal cycle ③. At the moment of the start of the fourth nominal cycle ④, the whole of the second packet 2 of data has been in the set of the temporary memory 53 and the buffer memory in the communication unit 55. As a result, the second packet 2 of data is transmitted to the network during the fourth nominal cycle ④.

In the prior-art slave station of FIG. 1, until data composing one complete packet has been written into the set of the temporary memory 53 and the buffer memory in the communication unit 55, the transmission of the packet of data to the network remains inhibited. Therefore, a long delay time tends to occur before the transmission of a first isochronous packet of data to the network is started.

First Embodiment

FIG. 3 shows a packet transmission apparatus according to a first embodiment of this invention. As shown in FIG. 3, the packet transmission apparatus includes an information source 101, a packet generator 102, a temporary memory or a buffer memory 103, a counting unit 104, a counter 105, a comparator 106, a controller 107, and a communication unit 108.

The information source 101 is connected to the packet generator 102, the counting unit 104, and the counter 105. The packet generator 102 is connected to the temporary memory 103. The temporary memory 103 is connected to the communication unit 108. The communication unit 108 is connected to a digital network. The counting unit 104 is connected to the comparator 106. The counter 105 is connected to the comparator 106. The comparator 106 is connected to the controller 107. The controller 107 is connected to the temporary memory 103 and the communication unit 108.

The information source 101 generates first data to be transmitted. The information source 101 includes, for example, an imaging device. In this case, the first data is picture data or video data. The information source 101 outputs the first data to the packet generator 102 at a first predetermined data rate. The packet generator 102 encodes the first data into second data of a predetermined packet format. Specifically, the packet generator 102 divides the first data into pieces, and adds headers to the data pieces to form packets respectively. Each packet has a header and a data piece. The packet generator 102 sequentially writes the packets of data into the temporary memory 103 at a second predetermined data rate substantially equal to the first predetermined data rate. The memory 103 temporarily stores every packet of data. The temporary memory 103 sequentially outputs the packets of data to the communication unit 108. The temporary memory 103 includes a FIFO memory. The communication unit 108 includes a buffer memory for temporarily storing the data outputted from the memory 103.

A master station (not shown) repetitively transmits a cycle start packet to the network at a predetermined period referred to as a nominal cycle. Every cycle start packet indicates the start of the related nominal cycle.

The communication unit 108 receives every cycle start packet from the network. The communication unit 108 informs the controller 107 of the reception of every cycle start packet. Thus, the communication unit 108 informs the controller 107 of the start of every nominal cycle. The controller 107 includes, for example, a microcomputer or a signal processor which operates in accordance with a program stored therein. The program is designed to implement the following processes. The device 107 controls the data readout from the temporary memory 103. To this end, the device 107 outputs a control signal to the temporary memory 107. In the case where predetermined conditions are satisfied, the controller 107 enables the communication unit 108 to transmit a packet of data to the network in response to a cycle start packet. The transmitted packet of data is an isochronous packet of data which has a third predetermined data rate accorded with the characteristics of the network. In general, the third predetermined data rate differs from the first predetermined data rate and the second predetermined data rate.

The counting unit 104 receives various timing signals from the information source 101 which relate to the first data outputted therefrom. The counting unit 104 calculates the number of transmittable packets of data from information pieces represented by the respective timing signals. Here, the transmittable packets mean (1) packets which have already been transmitted, and also (2) packets which are transmittable and have not yet been transmitted. The counting unit 104 generates a signal indicating the calculated number of transmittable packets of data. The counting unit 104 outputs the transmittable-packet-number signal to the comparator 106. The counter 105 receives a packet transmission timing signal from the communication unit 108 via the controller 107. The counter 105 calculates the number of packets of data, which have been transmitted from the communication unit 108 to the network, on the basis of an information piece represented by the packet transmission timing signal. The counter 105 outputs the transmitted-packet-number signal to the comparator 106. The device 106 compares the transmittable-packet number represented by the output signal of the counting unit 104 and the transmitted-packet number represented by the output signal of the counter 105. When the transmittable-packet number is greater than the transmitted-packet number, the comparator 106 outputs a packet transmission request signal to the controller 107. When the transmittable-packet number is not greater than the transmitted-packet number, the comparator 106 does not output the packet transmission request signal to the controller 107.

In response to the packet transmission request signal, the controller 107 requires the communication unit 108 to start the transmission of a packet of data to the network. Then, the communication unit 108 implements the following processes. After the communication unit 108 captures a cycle start packet from the network, the communication unit 108 transmits a packet (an isochronous packet) of data to the network. In this case, the device 107 controls the temporary memory 103, thereby transferring the remaining data in the packet to the communication unit 108 therefrom and enabling the communication unit 108 to implement the transmission of the whole of the packet of data to the network. When the transmission of the packet of data to the network is completed, the communication unit 108 outputs a packet transmission timing signal to the controller 107.

At a start of every frame represented by the output data from the information source 101, the information source 101 outputs a reset signal to the counting unit 104 and the counter 105. The transmittable-packet number represented by the output signal of the counting unit 104 is reset or initialized to "0" in response to the reset signal. Also, the transmitted-packet number represented by the output signal of the counter 105 is reset or initialized to "0" in response to the reset signal.

Figure 4:
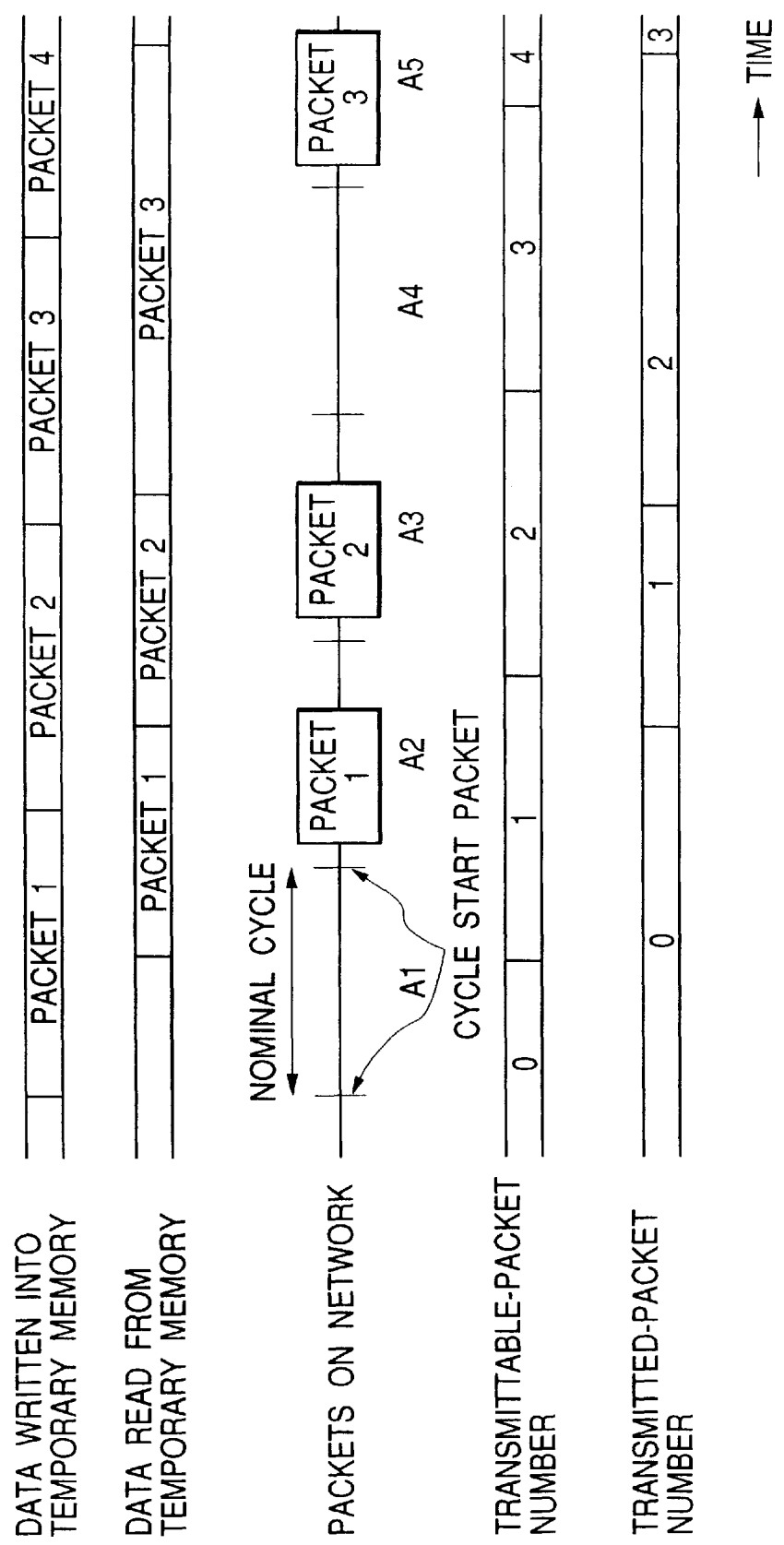
FIG. 4 is a time-domain diagram of various data and numbers which occur in the apparatus of FIG. 3.

The packet transmission apparatus of FIG. 3 operates as follows. With reference to FIG. 4, data composing a first packet 1 are sequentially written into the temporary memory 103 during a first nominal cycle A1 and a former portion of a second nominal cycle A2. Then, data composing a second packet 2 are sequentially written into the temporary memory 103 during a latter portion of the second nominal cycle A2 and a former portion of a third nominal cycle A3. Subsequently, data composing a third packet 3 are sequentially written into the temporary memory 103 during a latter portion of the third nominal cycle A3 and a former portion of a fourth nominal cycle A4. Then, data composing a fourth packet 4 are sequentially written into the temporary memory 103 during a latter portion of the fourth nominal cycle A4 and a former portion of a fifth nominal cycle A5.

With reference to FIG. 4, the transmittable-packet number represented by the output signal of the counting unit 104 is periodically incremented as the information source 101 outputs the first data to the packet generator 102 (or as the data is written into the temporary memory 103). Specifically, the transmittable-packet number increases from "0" to "1" at a moment within the first nominal cycle A1. The transmittable-packet number increases from "1" to "2" at a moment within the second nominal cycle A2. The transmittable-packet number increases from "2" to "3" at a moment within the fourth nominal cycle A4. The transmittable-packet number increases from "3" to "4" at a moment within the fifth nominal cycle A5.

At the start of every nominal cycle, the controller 107 decides whether or not a packet transmission request signal outputted from the comparator 106 is present or absent. With reference to FIG. 4, at the start of the first nominal cycle A1, both the transmittable-packet number represented by the output signal of the counting unit 104 and the transmitted-packet number represented by the output signal of the counter 105 are equal to "0" so that the comparator 106 does not output the packet transmission request signal and hence the controller 107 decides the absence of the packet transmission request signal. As a result, the controller 107 inhibits the communication unit 108 from transmitting a packet (an isochronous packet) of data to the network during the first nominal cycle A1.

With reference to FIG. 4, at the start of the second nominal cycle A2, the transmittable-packet number is "1" while the transmitted-packet number remains "0" so that the comparator 106 outputs the packet transmission request signal and hence the controller 107 decides the presence of the packet transmission request signal. As a result, the controller 107 enables the communication unit 108 to transmit a first packet 1 (a first isochronous packet 1) of data to the network during the second nominal cycle A2. In this case, the device 107 controls the temporary memory 103, thereby transferring the remaining data in the first packet 1 to the communication unit 108 therefrom and enabling the communication unit 108 to implement the transmission of the whole of the first packet 1 of data to the network. As shown in FIG. 4, only a short delay time occurs before the transmission of the first isochronous packet 1 of data to the network is started. When the transmission of the first packet 1 of data to the network is completed, the communication unit 108 outputs a packet transmission timing signal to the controller 107. The controller 107 passes the packet transmission timing signal to the counter 105. The counter 105 responds to the packet transmission timing signal. Specifically, the transmitted-packet number represented by the output signal of the counter 105 is incremented from "0" to "1" in response to the packet transmission timing signal. Thus, the transmitted-packet number increases from "0" to "1" at a moment before the third nominal cycle A3. The transmitted-packet number remains "1" when the second nominal cycle A2 is replaced by the third nominal cycle A3.

With reference to FIG. 4, at the start of the third nominal cycle A3, the transmittable-packet number is "2" while the transmitted-packet number is "1" so that the comparator 106 outputs the packet transmission request signal and hence the controller 107 decides the presence of the packet transmission request signal. As a result, the controller 107 enables the communication unit 108 to transmit a second packet 2 (a second isochronous packet 2) of data to the network during the third nominal cycle A3. In this case, the device 107 controls the temporary memory 103, thereby transferring the remaining data in the second packet 2 to the communication unit 108 therefrom and enabling the communication unit 108 to implement the transmission of the whole of the second packet 2 of data to the network. When the transmission of the second packet 2 of data to the network is completed, the communication unit 108 outputs a packet transmission timing signal to the controller 107. The controller 107 passes the packet transmission timing signal to the counter 105. The counter 105 responds to the packet transmission timing signal. Specifically, the transmitted-packet number represented by the output signal of the counter 105 is incremented from "1" to "2" in response to the packet transmission timing signal. Thus, the transmitted-packet number increases from "1" to "2" at a moment before the fourth nominal cycle A4. The transmitted-packet number remains "2" when the third nominal cycle A3 is replaced by the fourth nominal cycle A4.

With reference to FIG. 4, at the start of the fourth nominal cycle A4, the transmittable-packet number remains "2" while the transmitted-packet number is also "2" so that the comparator 106 does not output the packet transmission request signal and hence the controller 107 decides the absence of the packet transmission request signal. As a result, the controller 107 inhibits the communication unit 108 from transmitting a packet (an isochronous packet) of data to the network during the fourth nominal cycle A4. During the fourth nominal cycle A4, since a packet of data is not transmitted to the network, the transmitted-packet number remains "2". Further, the transmitted-packet number remains "2" when the fourth nominal cycle A4 is replaced by the fifth nominal cycle A5.

With reference to FIG. 4, at the start of the fifth nominal cycle A5, the transmittable-packet number is "3" while the transmitted-packet number is "2" so that the comparator 106 outputs the packet transmission request signal and hence the controller 107 decides the presence of the packet transmission request signal. As a result, the controller 107 enables the communication unit 108 to transmit a third packet 3 (a third isochronous packet 3) of data to the network during the fifth nominal cycle A5. In this case, the device 107 controls the temporary memory 103, thereby transferring the remaining data in the third packet 3 to the communication unit 108 therefrom and enabling the communication unit 108 to implement the transmission of the whole of the third packet 3 of data to the network. When the transmission of the third packet 3 of data to the network is completed, the communication unit 108 outputs a packet transmission timing signal to the controller 107. The controller 107 passes the packet transmission timing signal to the counter 105. The counter 105 responds to the packet transmission timing signal. Specifically, the transmitted-packet number represented by the output signal of the counter 105 is incremented from "2" to "3" in response to the packet transmission timing signal. Thus, the transmitted-packet number increases from "2" to "3" at a moment before a sixth nominal cycle A6. The transmitted-packet number remains "3" when the fifth nominal cycle A5 is replaced by the sixth nominal cycle A6.

Figure 5:
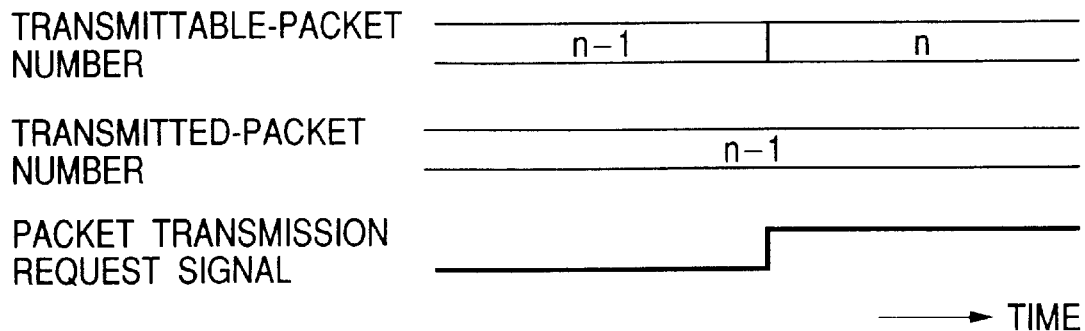
FIG. 5 is a time-domain diagram of a transmittable-packet number, a transmitted-packet number, and a packet transmission request signal which occur in the apparatus of FIG. 3.

The comparator 106 is designed to implement the following processes. As shown in FIG. 5, when both the transmittable-packet number and the transmitted-packet number are equal to an integer "n", the comparator 106 outputs a low-level signal to the controller 107 which indicates the absence of the packet transmission request signal. When the transmittable-packet number and the transmitted-packet number are equal to an integer "n+1" and an integer "n" respectively, that is, when the transmittable-packet number is greater than the transmitted-packet number, the comparator 106 outputs a high-level signal to the controller 107 as the packet transmission request signal.

Figure 6:
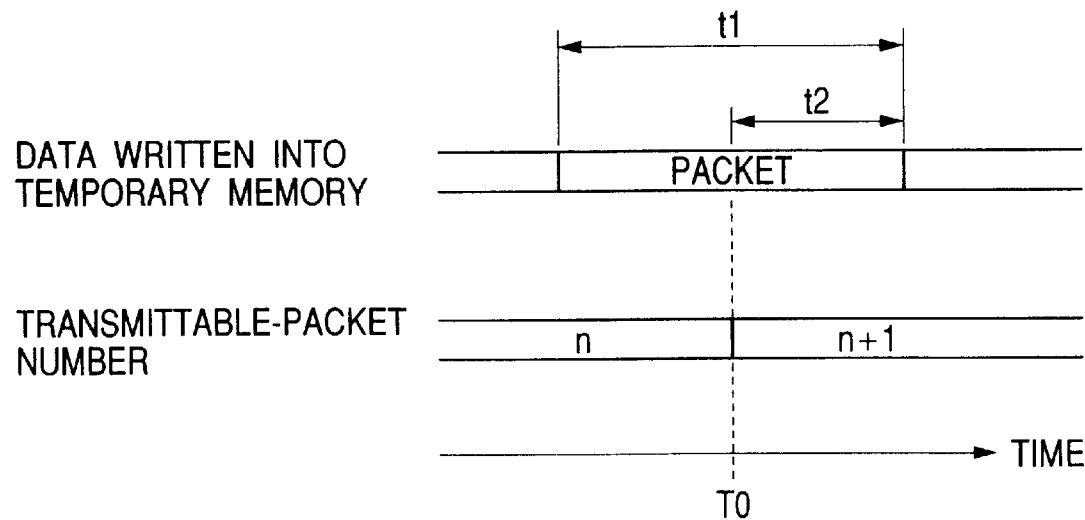
FIG. 6 is a time-domain diagram of data written into a temporary memory, and the transmittable-packet number which occur in the apparatus of FIG. 3.

The counting unit 104 increments the transmittable-packet number at a timing as follows. With reference to FIG. 6, data composing one complete packet are written into the temporary memory 103 during a time interval t1. The character t2 denotes the shortest time interval which is taken by the communication unit 108 to transmit one complete isochronous packet to the network in response to a received cycle start packet. Specifically, the time interval t2 corresponds to a time interval from the moment at which the head of a received cycle start packet occurs to the moment at which the transmission of one complete isochronous packet to the network ends. The time interval t2 is determined by the characteristics of the network. At a moment or timing T0 which follows the moment of the start of the packet-data writing into the temporary memory 103 by a time interval equal to the time interval t1 minus the time interval t2, the transmittable-packet number is incremented.

In the case where picture data in every packet represent pixels composing one line, the counting unit 104 increments the transmittable-packet number when a picture data piece representing a k-th pixel (a given order-number pixel) among the pixels occurs. In this case, the temporal position of the k-th pixel corresponds to the previously-indicated timing T0.

Figure 7:
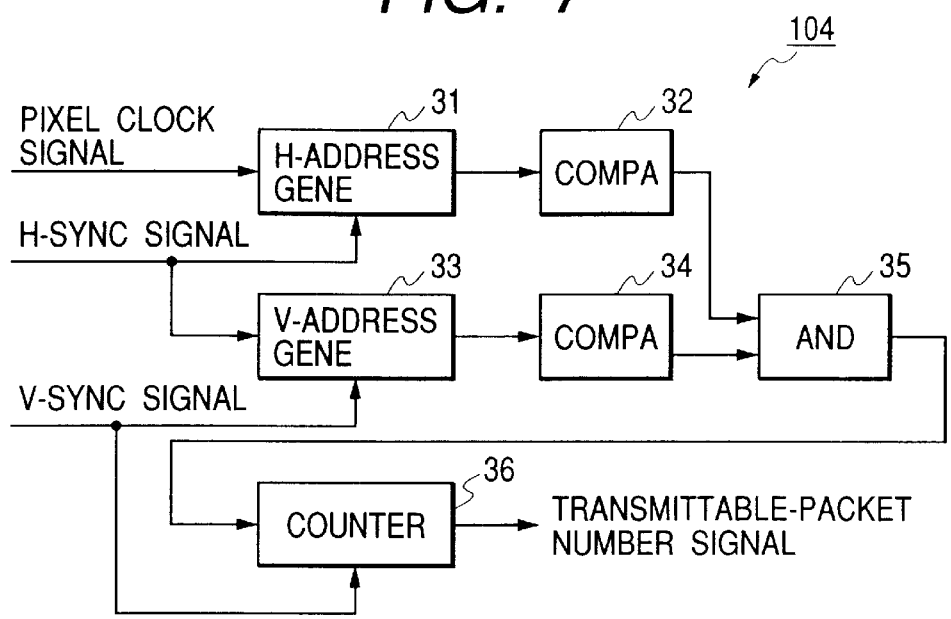
FIG. 7 is a block diagram of a counting unit in the apparatus of FIG. 3.

As shown in FIG. 7, the counting unit 104 includes a horizontal address generator 31, a comparator 32, a vertical address generator 33, a comparator 34, an AND circuit 35, and a counter 36. The horizontal address generator 31 is connected to the comparator 32. The comparator 32 is connected to the AND circuit 35. The vertical address generator 33 is connected to the comparator 34. The comparator 34 is connected to the AND circuit 35. The AND circuit 35 is connected to the counter 36.

The horizontal address generator 31 receives a pixel-corresponding clock signal and a horizontal sync signal from the information source 101 (see FIG. 3). During every frame, the horizontal address generator 31 counts pulses of the pixel-corresponding clock signal, and thereby generates a signal representing a horizontal-direction address (a horizontal pixel position) within the frame in accordance with the counted pulse number. The horizontal address generator 31 outputs the horizontal-direction address signal to the comparator 32. The horizontal address generator 31 is reset by every pulse of the horizontal sync signal.

The device 32 compares the horizontal-direction address signal with a reference signal representing a predetermined horizontal-direction address equal to the horizontal-direction address of the previously-indicated k-th pixel. When the horizontal-direction address represented by the output signal of the horizontal address generator 31 is equal to the horizontal-direction address of the k-th pixel, the comparator 32 outputs a high-level signal to the AND circuit 35 as an identity-indicating signal. Otherwise, the comparator 32 outputs a low-level signal to the AND circuit 35.

The vertical address generator 33 receives the horizontal sync signal and a vertical sync signal from the information source 101 (see FIG. 3). During every frame, the vertical address generator 33 counts pulses of the horizontal sync signal, and thereby generates a signal representing a vertical-direction address (a line position, that is, the vertical position of a line) within the frame in accordance with the counted pulse number. The vertical address generator 33 outputs the vertical-direction address signal to the comparator 34. The vertical address generator 33 is reset by every pulse of the vertical sync signal.

The device 34 compares the vertical-direction address signal with a reference signal representing predetermined vertical-direction addresses equal to the positions of predetermined lines for which the transmission of packets is permitted. When the vertical-direction address represented by the output signal of the vertical address generator 33 is equal to one of the predetermined vertical-direction addresses, the comparator 34 outputs a high-level signal to the AND circuit 35 as an identity-indicating signal. Otherwise, the comparator 34 outputs a low-level signal to the AND circuit 35.

The AND circuit 35 outputs a high-level signal to the counter 36 when both the output signals of the comparators 32 and 34 are in their high-level states. Otherwise, the AND circuit 35 outputs a low-level signal to the counter 36. During every frame, the device 36 counts every high-level signal outputted from the AND circuit 35, and thereby generates a signal indicating the number of transmittable packets of data which is equal to the count result. The counter 36 outputs the transmittable-packet-number signal to the comparator 106 (see FIG. 3). The counter 36 receives the vertical sync signal from the information source 101. The counter 36 is reset by every pulse of the vertical sync signal.

It should be noted that the information source 101 may include an audio playback device. In this case, the data outputted from the information source 101 is audio data. Alternatively, the information source 101 may include a video-disc drive, a video-tape playback device, or a video-storage drive.

In the case where the counting unit 104 and the counter 105 include ring counters designed for large countable numbers respectively, it is unnecessary to reset the transmittable-packet number and the transmitted-packet number for every frame.

According to a modification of the counting unit 104, pulses of the pixel-corresponding clock signal are counted, and a timing at which the transmittable-packet number is incremented is provided simply by the count result.

It should be noted that isochronous packets of data may be replaced by normal packets of data.

Second Embodiment

A second embodiment of this invention is similar to the first embodiment thereof except for design changes explained later. In the second embodiment of this invention, picture data in every packet represent pixels composing a pair of two successive lines, and a picture data piece representing a k-th pixel (a given order-number pixel) in the second line in the pair corresponds to the timing T0 at which the transmittable-packet number is incremented.

In the second embodiment of this invention, the device 34 (see FIG. 7) compares the vertical-direction address signal with a reference signal representing predetermined vertical-direction addresses equal to the positions of even-numbered lines for which the transmission of packets is permitted. Thus, during every frame, the transmittable-packet number is incremented at a moment corresponding to the k-th pixel in each of the even-numbered lines (the second line, the fourth line, the sixth line, . . . ).

Third Embodiment

A third embodiment of this invention is similar to the first embodiment thereof except for design changes explained later. In the third embodiment of this invention, the counter 105 (see FIG. 3) generates a comparison permission/inhibition signal in relation to the transmitted-packet-number signal. The counter 105 outputs the comparison permission/inhibition signal to the comparator 106 (see FIG. 3). A high-level state of the comparison permission/inhibition signal permits the comparator 106 to implement signal comparison. A low-level state of the comparison permission/inhibition signal inhibits the comparator 106 from implementing signal comparison.

Figure 8:
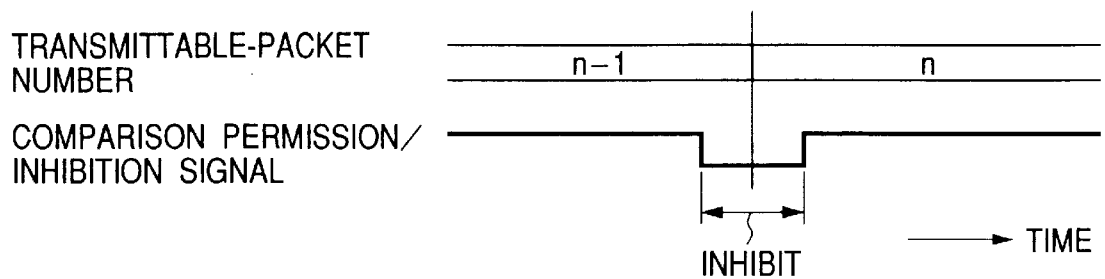
FIG. 8 is a time-domain diagram of a transmitted-packet number and a comparison permission/inhibition signal which occur in a packet transmission apparatus according to a third embodiment of this invention.

As shown in FIG. 8, the comparison permission/inhibition signal is in its low-level state during every given short time interval containing the moment at which the transmitted-packet number is incremented. The comparison permission/inhibition signal is in its high-level state during other time intervals. Thus, it is possible to prevent the comparator 106 from implementing signal comparison under unstable conditions which might occur upon the increment of the transmitted-packet number.

What is claimed is:

1. A method comprising the steps of:
  a) sequentially outputting data, and outputting a timing signal related to the data;
  b) producing a packet from the data outputted by the step a);
  c) temporarily storing the packet produced by the step b), and outputting the packet;
  d) detecting a specified relative timing within a duration of the packet which is being stored by the step c) in response to the timing signal outputted by the step a); and
  e) receiving the packet outputted by the step c), and transmitting the packet during a first nominal cycle after the step
  d) detects the specified relative timing.

2. A method comprising the steps of:
  a) sequentially outputting data, and outputting a timing signal related to the data;
  b) sequentially producing packets from the data outputted by the step a);
  c) temporarily storing the packets produced by the step b), and sequentially outputting the packets;
  d) detecting a specified relative timing within a duration of each packet which is being stored by the step c) in response to the timing signal outputted by the step a);
  e) incrementing a first packet number when the step d) detects the specified relative timing;
  f) deciding whether the first packet number incremented by the step e) is equal to or different from a second packet number at a start of every nominal cycle;
  g) receiving a packet outputted by the step c), and transmitting the received packet during a nominal cycle having a start at which the step f) decides that the first packet number is different from the second packet number; and
  h) incrementing the second packet number when the transmission of the packet by the step g) is completed.

3. A method as recited in claim 2, wherein the step d) comprises:
  counting pulses of a pixel-corresponding clock signal in the timing signal outputted by the step a), and generating a signal representing a horizontal address in accordance with the number of the counted pulses;
  comparing the horizontal-address signal with a first reference signal representing a predetermined horizontal address, and outputting a first identity-indicating signal when the horizontal-address signal is equal to the first reference signal;
  counting pulses of a horizontal sync signal in the timing signal outputted by the step a), and generating a signal representing a vertical address in accordance with the number of the counted pulses;
  comparing the vertical-address signal with a second reference signal representing at least one predetermined vertical address, and outputting a second identity-indicating signal when the vertical-address signal is equal to the second reference signal; and
  detecting a timing at which both the first identity-indicating signal and the second identity-indicating signal are outputted as the specified relative timing.

4. A packet transmission apparatus comprising:
  an information source sequentially outputting data, and outputting a timing signal related to the data;
  a packet generator producing a packet from the data outputted by the information source;
  a FIFO memory temporarily storing the packet produced by the packet generator, and outputting the packet;
  first means for detecting a specified relative timing within a duration of the packet which is being inputted into the FIFO memory in response to the timing signal outputted by the information source; and
  second means for receiving the packet outputted by the FIFO memory, and transmitting the packet during a first nominal cycle after the first means detects the specified relative timing.

5. A packet transmission apparatus comprising:
  an information source sequentially outputting data, and outputting a timing signal related to the data;

a packet generator sequentially producing packets from the data outputted by the information source;

a FIFO memory temporarily storing the packets produced by the packet generator, and sequentially outputting the packets;

first means for detecting a specified relative timing within a duration of each packet which is being inputted into the FIFO memory in response to the timing signal outputted by the information source;

second means for incrementing a first packet number when the first means detects the specified relative timing;

third means for deciding whether the first packet number incremented by the second means is equal to or different from a second packet number at a start of every nominal cycle;

fourth means for receiving a packet outputted by the FIFO memory, and transmitting the received packet during a nominal cycle having a start at which the third means decides that the first packet number is different from the second packet number; and fifth means for incrementing the second packet number when the transmission of the packet by the fourth means is completed.

6. A packet transmission apparatus as recited in claim 5, wherein the first means comprises:

a horizontal address generator for counting pulses of a pixel-corresponding clock signal in the timing signal outputted by the information source, and generating a signal representing a horizontal address in accordance with the number of the counted pulses;

a first comparator for comparing the horizontal-address signal generated by the horizontal address generator with a first reference signal representing a predetermined horizontal address, and for outputting a first identity-indicating signal when the horizontal-address signal is equal to the first reference signal;

a vertical address generator for counting pulses of a horizontal sync signal in the timing signal outputted by the information source, and generating a signal representing a vertical address in accordance with the number of the counted pulses;

a second comparator for comparing the vertical-address signal generated by the vertical address generator with a second reference signal representing at least one predetermined vertical address, and for outputting a second identity-indicating signal when the vertical-address signal is equal to the second reference signal; and means for detecting a timing at which the first comparator and the second comparator output the first identity-indicating signal and the second identity-indicating signal as the specified relative timing.

* * * * *